(12) United States Patent
Heil

(10) Patent No.: US 7,225,297 B2
(45) Date of Patent: May 29, 2007

(54) COMPRESSED CACHE LINES INCORPORATING EMBEDDED PREFETCH HISTORY DATA

(75) Inventor: Timothy Hume Heil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 10/857,745

(22) Filed: May 28, 2004

(65) Prior Publication Data

US 2005/0268046 A1    Dec. 1, 2005

(51) Int. Cl.
*G06F 12/00*    (2006.01)
(52) U.S. Cl. ........................... 711/137; 711/156
(58) Field of Classification Search .............. None
See application file for complete search history.

(56) References Cited

U.S. PATENT DOCUMENTS

| | | | | |
|---|---|---|---|---|
| 5,051,893 A | * | 9/1991 | Tenny et al. ................. | 717/141 |
| 5,832,205 A | * | 11/1998 | Kelly et al. ................... | 714/53 |
| 5,958,061 A | * | 9/1999 | Kelly et al. ................... | 714/1 |
| 5,995,975 A | * | 11/1999 | Malcolm ................ | 707/103 R |
| 5,999,933 A | * | 12/1999 | Mehta ........................ | 707/100 |
| 6,145,069 A | * | 11/2000 | Dye ........................... | 711/170 |
| 6,324,621 B2 | * | 11/2001 | Singh et al. ................. | 711/129 |
| 6,353,871 B1 | * | 3/2002 | Benveniste et al. ............ | 711/3 |
| 6,564,223 B1 | * | 5/2003 | Sexton et al. ............ | 707/103 Y |
| 6,630,933 B1 | * | 10/2003 | Van Hook ................. | 345/422 |
| 6,678,795 B1 | * | 1/2004 | Moreno et al. ............. | 711/137 |
| 6,681,348 B1 | * | 1/2004 | Vachon ........................ | 714/45 |
| 6,735,673 B2 | * | 5/2004 | Kever ......................... | 711/118 |
| 6,822,589 B1 | * | 11/2004 | Dye et al. ...................... | 341/51 |
| 6,898,311 B2 | * | 5/2005 | Whitehead ................... | 382/166 |
| 6,981,119 B1 | * | 12/2005 | Lepak et al. ................. | 711/170 |
| 7,058,785 B1 | * | 6/2006 | Ochotta ....................... | 711/202 |
| 2005/0055351 A1 | * | 3/2005 | Barton et al. ................. | 707/10 |
| 2005/0120162 A1 | * | 6/2005 | Sivaram ..................... | 711/101 |
| 2005/0144387 A1 | * | 6/2005 | Adl-Tabatabai et al. .... | 711/118 |

OTHER PUBLICATIONS

Stephen Browan and Zvonko Vranesic, Fundamentals of Digital Logic with VHDL Design, 2000, McGraw-Hill Higher Education, pp. 47-48.*
Jamison Collins, et al., "Pointer Cache Assisted Prefetching," in Proceedings of the 35th Annual International Symposium on Microarchitecture (MICRO-35), Nov. 2002, pp. 1-2.

* cited by examiner

*Primary Examiner*—Reginald Bragdon
*Assistant Examiner*—Shawn Gu
(74) *Attorney, Agent, or Firm*—Wood Heron & Evans, LLP

(57) ABSTRACT

An apparatus and method utilize compressed cache lines that incorporate embedded prefetch history data associated with such cache lines. In particular, by compressing at least a portion of the data in a cache line, additional space may be freed up in the cache line to embed prefetch history data associated with the data in the cache line. By doing so, long-lived prefetch history data may essentially be embedded in a cache line and retrieved in association with that cache line to initiate the prefetching of additional data that is likely to be accessed based upon historical data generated for that cache line, and often with no little or no additional storage overhead.

32 Claims, 4 Drawing Sheets

COMPRESSED CACHE LINES INCORPORATING EMBEDDED PREFETCH HISTORY DATA

FIELD OF THE INVENTION

The invention relates to computers, and in particular to memory architectures and prefetching in a computer with a multi-level memory architecture.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on system performance. Often, a computer relies on a relatively large, slow and inexpensive mass storage system such as a hard disk drive or other external storage device, an intermediate main storage memory that uses dynamic random access memory devices (DRAM's) or other volatile memory storage devices, and one or more high speed, limited capacity cache memories, or caches, implemented with static random access memory devices (SRAM's) or the like. Often multiple levels of cache memories are used, each with progressively faster and smaller memory devices. Also, depending upon the memory architecture used, cache memories may be shared by multiple microprocessors or dedicated to individual microprocessors, and may either be integrated onto the same integrated circuit as a microprocessor, or provided on a separate integrated circuit.

Moreover, some cache memories may be used to store both instructions, which comprise the actual programs that are being executed, and the data being processed by those programs. Other cache memories, often those closest to the microprocessors, may be dedicated to storing only instructions or data.

When multiple levels of memory are provided in a computer architecture, one or more memory controllers are typically relied upon to swap needed data from segments of memory addresses, often known as "cache lines", between the various memory levels to attempt to maximize the frequency that requested data is stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slower, lower level memory, often with a significant performance penalty.

Caching depends upon both temporal and spatial locality to improve system performance. Put another way, when a particular cache line is retrieved into a cache memory, there is a good likelihood that data from that cache line will be needed again, so the next access to data in the same cache line will result in a "cache hit" and thus not incur a performance penalty.

One manner of increasing the performance benefits of caching involves the use of prefetching, which generally attempts to predict future program references, directed to program instructions and/or data accessed by program instructions, and fetch such information into a cache before the information is actually needed. As such, when the information is later requested, the likelihood increases that the information will already be present in the cache, thus averting the potential occurrence of a cache miss.

Prefetching can rely on a number of different algorithms. For example, prefetching may be history-based (also referred to as context-based), whereby access patterns in a program are monitored to attempt to detect repeating sequences of accesses, or even repeating sequences of cache misses. For example, history-based prefetching may be used to detect that whenever a reference to cache line X occurs, it is usually followed by references to cache lines Y and Z. As such, whenever a reference to cache line X occurs, a prefetch engine may be used to automatically initiate a prefetch of cache lines Y and Z so that when the references to those cache lines do occur, the fetches of those lines will be completed, or at least already underway.

One drawback to conventional history-based prefetching algorithms, however, is the requirement for relatively large hardware tables to store detected sequences of accesses. Large size hardware tables tend to occupy too much area on a hardware integrated circuit, and thus add to the cost and complexity of the hardware. Smaller size hardware tables often are incapable of storing enough prefetch history data to appreciably improve performance.

Therefore, a significant need has arisen in the art for a manner of improving the performance of and reducing the storage requirements for a history-based prefetching algorithm.

SUMMARY OF THE INVENTION

The invention addresses these and other problems associated with the prior art by utilizing compressed cache lines that incorporate embedded prefetch history data associated with such cache lines. In particular, by compressing at least a portion of the data in a cache line, additional space may be freed up in the cache line to embed prefetch history data associated with the data in the cache line. As such, in many embodiments consistent with the invention, long-lived prefetch history data may essentially be embedded in a cache line and retrieved in association with that cache line to initiate the prefetching of additional data that is likely to be accessed based upon historical data generated for that cache line, and often with little or no additional storage overhead.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
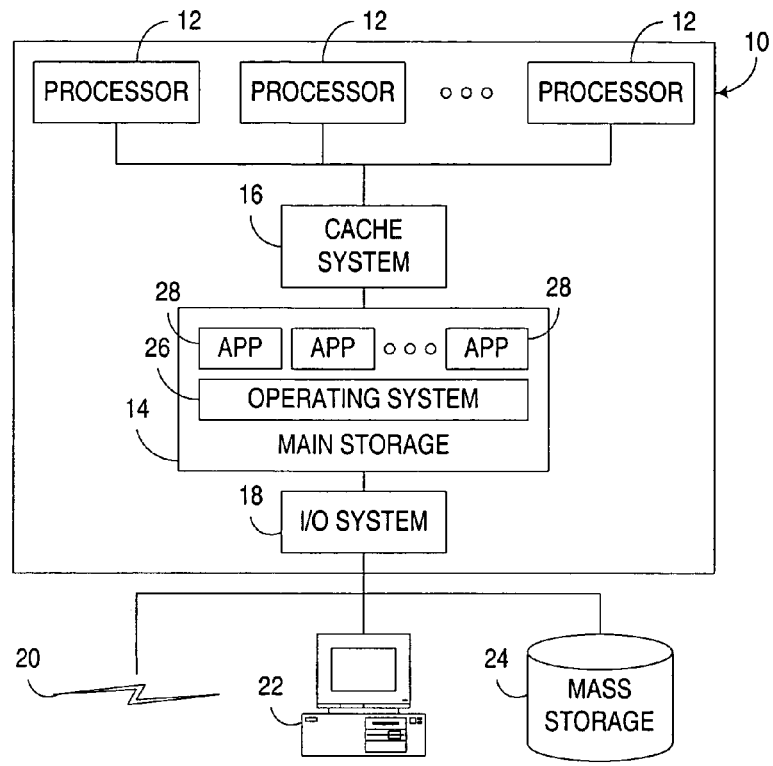
FIG. 1 is a block diagram of an exemplary apparatus incorporating compression-based prefetching consistent with the invention.

The embodiments discussed and illustrated hereinafter utilize compressed cache lines with embedded prefetch history data to retain prefetch information usable in the context of history-based prefetching. In particular, the illustrated embodiments compress data within each cache line to provide enough space to store prefetch history information. Typically, by doing so, large hardware tables are not required, and prefetch history is long-lived.

As such, a cache line consistent with the invention includes, when stored in a lower level memory such as a lower level cache, main storage and/or persistent storage, compressed data along with prefetch history data. The prefetch history data may also be compressed, or may be uncompressed, and may include any information usable by a prefetching algorithm in determining additional data to prefetch in association with the retrieval of a cache line.

Should both non-compressed and compressed cache lines be supported in the same environment (e.g., where some cache lines are incapable of being compressed, or of being compressed enough to store adequate prefetch history data), it may be desirable to include an indicator in each cache line to indicate whether that cache line is compressed. In many embodiments, only one extra bit per cache line is required to indicate if a cache line in memory has been compressed. Further, the indication of the compression status of a cache line may be embedded into other information associated with the cache line, e.g., using one or more ECC bits, to provide the indication without extra storage. As one example, where error checking is performed over multiple words, often all of the ECC bits supported by ECC-compatible memory will not be required, whereby an unused ECC bit may be used for providing the compressed indication for a multi-word cache line.

Typically, the prefetch history data for a cache line identifies additional memory addresses (e.g., one or more additional cache lines) for which it may be desirable to prefetch in association with retrieval of a cache line with which the prefetch history data is associated. Such identification may be provided, for example, through the use of prefetch pointers, which may be absolute or relative (e.g., an offset from the current cache line). Other manners of identifying additional memory addresses to prefetch may also be used. For example, prefetch history data may incorporate a bitmap mask (or a pointer thereto) that identifies which cache lines among nearby cache lines should be prefetched. Also, prefetch history data may incorporate an index into a table, or other mechanism for identifying additional memory addresses or cache lines. Furthermore, it may be desirable in some embodiments to additionally incorporate into the prefetch history data confidence data that is used to determine whether particular memory addresses or cache lines identified in the prefetch history data should be prefetched under the current operating conditions, e.g., to avoid prefetching cache lines for which there is only a low confidence that the data therein will actually be used.

In many environments, high compression ratios are not required. For example, in some embodiments, it may be desirable to identify up to two additional cache lines to be prefetched in association with retrieval of a particular cache line. Assuming 64-bit addressing, and 128-byte cache lines, the storage of two prefetch pointers to address two additional cache lines might require 16 bytes of storage. A 128-byte cache line would therefore only need to be compressed by 12.5 percent ($^{16}/_{128}$) to provide suitable storage for the prefetch history data, an amount that can be obtained using a number of relatively simple and computationally inexpensive compression schemes.

Given that high compression ratios are not required in many environments, relatively simple and computationally inexpensive compression schemes may be used. For example, compression may be performed on each word in a cache line individually to make decompression circuitry local to each word. A simple compression technique such as significant-bit compression, which compresses small integer values by not storing all of the repeating upper bits, may be used. Other compression schemes, such as compressing known common values, using an abbreviation table, or other known techniques, may be used.

As such, during retrieval of a compressed cache line consistent with the invention (e.g., in response to a miss to the cache line), the compressed data in the cache line is decompressed and stored in uncompressed format in a cache. Furthermore, the embedded prefetch history data is extracted from the compressed cache line and used by a prefetch engine or similar logic to initiate the prefetching of additional data, if appropriate.

Compression of a cache line, and embedding of prefetch history data, typically occurs during a cast out operation on the cache line, which initiates writing a compressed cache line back to memory. Moreover, it will be appreciated that in some embodiments unmodified cache lines for which prefetch history data has changed may still need to be written to memory, even if the cache line data itself has not been modified.

Turning now to the Drawings, wherein like numbers denote like parts throughout the several views, FIG. 1 illustrates a computer 10 incorporating compression-based prefetching consistent with the invention. Computer 10 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 10 generally includes one or more processors 12 coupled to a main storage 14 through one or more levels of cache memory disposed within a cache system 16. In some embodiments each processor 12 may include multiple processing cores. Furthermore, main storage 14 is coupled to a number of types of external devices via a system input/output (I/O) system 18, e.g., one or more networks 20, one or more workstations 22 and one or more mass storage devices 24. Any number of alternate computer architectures may be used in the alternative.

Also shown resident in main storage 14 is a typical software configuration for computer 10, including an operating system 26 (which may include various components such as kernels, device drivers, runtime libraries, etc.) accessible by one or more applications 28.

Figure 2:
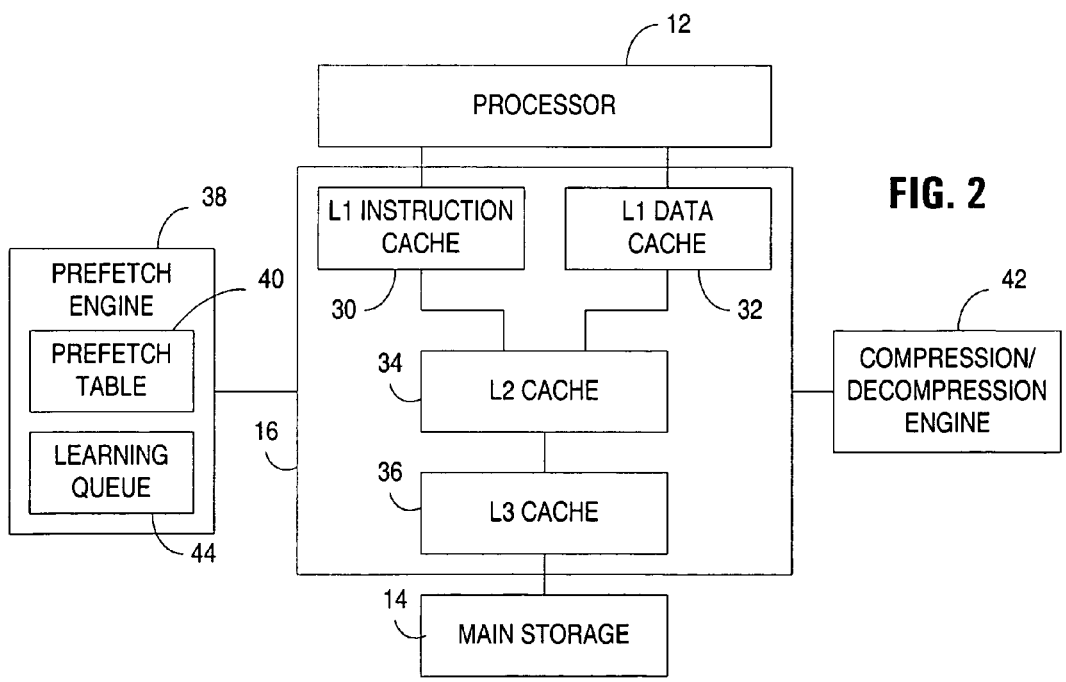
FIG. 2 is a block diagram of the interconnection of a processor with a main storage via a cache system in the apparatus of FIG. 1.

FIG. 2 next illustrates the interconnection of one of processors 12 from computer 10 with main storage 14 via cache system 16. In the illustrated implementation, cache system 16 is shown including three levels of cache, with a first level (L1) including separate instruction and data caches 30, 32, and with second and third level (L2 and L3) caches 34, 36 configured to cache both instructions and data. As is known in the art, each of caches 30–36 may be integrated onto the same integrated circuit device or chip as processor 12, or may be disposed on one or more external chips. Moreover, each of caches 30–36 may be dedicated to processor 12, or shared by processor 12 with one or more additional processors. Furthermore, as noted above, any processor 12 may include one or more cores providing separate paths of execution, and one or more cache memories may be dedicated to individual cores in some implementations.

It will be appreciated that each cache 30–36 typically includes a cache memory, representing the storage space for cache lines maintained by a cache, as well as a cache controller that manages the retrieval of cache lines from lower levels of memory and the casting out of cache lines to such lower levels of memory. Furthermore, additional components, e.g., a cache directory, will also typically be incorporated in a cache, as is known by those of ordinary skill in the art.

A prefetch engine 38 incorporating a prefetch history table 40, and a compression/decompression engine 42, are coupled to cache system 16, and may be used to implement the herein-described compression-based prefetching. Prefetch engine 38 may be used to receive the prefetch history data from a retrieved cache line and initiate (if appropriate) one or more additional fetch operations to prefetch additional data based upon a prefetch algorithm. Furthermore, prefetch engine 38 may also be used to generate prefetch history data to be embedded in a cache line that is being cast out to memory.

Prefetch history table 40, which may be implemented using other appropriate data structures, typically stores the prefetch history data maintained by the prefetch engine for the cache lines that are currently present in a cache. As noted above, typically a prefetch history table consistent with the invention need only store prefetch history data for current cache lines (e.g., using individual entries associated with each cache line), thus reducing the size of the prefetch history table as compared to conventional designs.

Compression/decompression engine 42 implements the compression and decompression functionalities required to convert cache lines between an uncompressed format in a cache and a compressed format in memory or a lower level cache. As noted above, practically any known compression/decompression algorithm may be used in engine 42 consistent with the invention.

Also, as discussed above, it may be desirable in some environments to track memory accesses, or just memory accesses that generate cache misses, to assist in generating and updating prefetch history data, including confidence data. For example, as shown in FIG. 2, where prefetch pointers are used, it may be desirable for the prefetch engine to store retrieved prefetch pointers associated with a cache line in a learning queue 44, which is then used to monitor subsequent misses to update the prefetch pointers and confidence data associated with the cache line. Each cache access or miss is compared against the prefetch pointers in the learning queue. If the address of an access matches the address of a prefetch pointer, then the confidence associated with that prefetch pointer may be increased. If, when the prefetch pointer is removed from the learning queue, no matching accesses have been observed, the confidence of that prefetch pointer may be reduced, or the prefetch pointer may be eliminated or replaced with another prefetch pointer which is expected to be more effective. After the next few access or misses have been observed, the prefetch engine may move the prefetch pointers and confidence data to an entry in prefetch history table 40 that is associated with the cache line.

Once prefetch history data has been placed in the prefetch history table, it may not be used again until the associated line is replaced from the cache. Alternatively, the prefetch history table may also be consulted on cache hits, as well as misses, so that the prefetch engine may initiate additional prefetch requests. When a line in the cache is replaced, the prefetch history data in the associated entry in the prefetch history table is consulted. If this entry contains useful prefetch information, compression/decompression engine 42 will likely compress the cache line and combine it with this prefetch history data, and the combined data will be written to memory.

In contrast with conventional prefetch history tables, prefetch history table 40 may only need to be a fraction of the cache size, rather than a fraction of the data structures being prefetched, given that the table is typically required to store prefetch history data unchanged until the cache line is cast out.

It will be appreciated that compression-based prefetching may be incorporated at practically any level in a multi-level memory architecture consistent with the invention. For example, it may be desirable to store cache lines in compressed format in main storage, and implement the cache line decompression and prefetch history data extraction for cache lines as they are retrieved into the lowest level cache (e.g., L3 cache 36 in the implementation of FIG. 2). Cache lines may be stored in compressed or uncompressed formats at different levels in an architecture, and the same format may be used in multiple levels of an architecture. As such, a memory from which a cache retrieves a compressed cache line, and to which a cache casts out a cache line in compressed format, may represent not only main storage, but also lower levels of caches, persistent storage, or any other lower level of memory in a multi-level memory architecture.

Furthermore, while prefetch engine 38 and compression/decompression engine 42 are illustrated as separate components in FIG. 2, it will be appreciated that either or both of these components may be incorporated into other hardware components consistent with the invention. For example, either or both may be incorporated into a cache controller for one or more of the caches 30–36. The invention may therefore be implemented in practically any suitable circuit arrangement, incorporating one or more integrated circuit devices, as will be appreciated by one of ordinary skill in the art.

Returning to FIG. 1, computer 10, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
FIG. 3 is a block diagram of an exemplary compressed cache line with embedded prefetch history suitable for use in the apparatus of FIG. 1.
Figure 4:
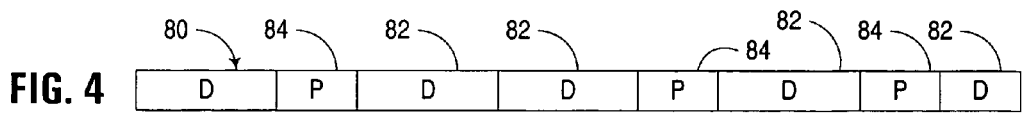
FIG. 4 is a block diagram of an alternate exemplary compressed cache line with embedded prefetch history to that of FIG. 4.

As noted above, the manner in which prefetch history data may be embedded in a compressed cache line may vary in different embodiments. For example, FIG. 3 illustrates an exemplary compressed cache line 70 including compressed cache data 72 and prefetch history data 74, segmented into two separate fields in the compressed cache line. In the alternative, as illustrated by compressed cache line 80 of FIG. 4, compressed cache data and prefetch history data may be interleaved or interspersed in fields 82, 84 in some embodiments. In addition, the size of each field may vary within a compressed cache line, or even among different cache lines. It may be desirable, for example to compress cache data on a word-by-word basis, thus simplifying the compression logic. In such instances, the prefetch history data may be interspersed among the various unused space in each word of a compressed cache line.

It will also be appreciated that the prefetch history data may be embedded in a compressed cache line after compression of the cache data. In the alternative, the prefetch history data may additionally be compressed, either as a separate operation from compression of the cache data, or as a combined compression operation. In this latter instance, the embedding of prefetch history data in the cache line would typically occur prior to compression of the cache line.

Figure 5:
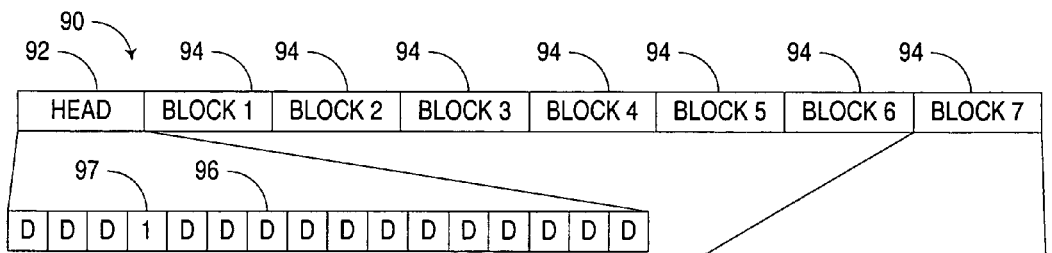
FIG. 5 is a block diagram of another alternate exemplary compressed cache line with embedded prefetch history to that of FIG. 4.

In addition, it will be appreciated that a compressed cache line may include additional information embedded in the cache line to assist in the decompression of the cache line. For example, as illustrated by compressed cache line 90 of FIG. 5, a cache line may be broken into a header block 92 along with a number of additional data blocks 94. Within each such block 92, 94 may be included cache data fields 96 and/or prefetch history data fields 98. In addition, as illustrated by fields 97, 99, it may also be desirable to incorporate control fields within each block 92, 94. Field 97, for example, illustrates a level one control block, which may be used to indicate which of the blocks 92, 94 in the compressed cache line is compressed. In addition, each block may include a level two control field 99, which indicates how the following words in each block are compressed.

It will be appreciated that an innumerable number of cache line formats may be used consistent with the invention. Therefore, the invention is not limited to the specific implementations discussed herein.

Figure 6:
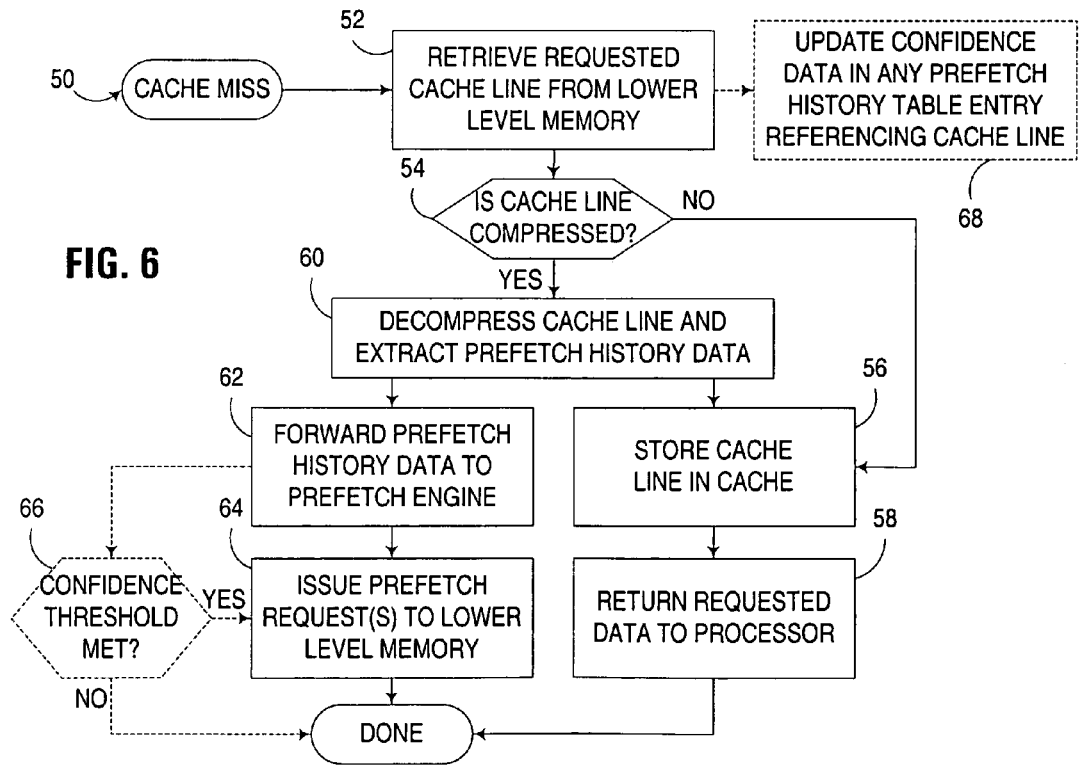
FIG. 6 is a flowchart illustrating the steps performed in response to a cache miss in the apparatus of FIG. 1.

FIG. 6 next illustrates a cache miss routine 50, representing the sequence of steps that occur in response to a cache miss generated as a result of an access request by a processor to a cache line that is not currently present in a cache. It will be appreciated that the various steps illustrated in FIG. 6 are typically performed by one or more circuit arrangements incorporating one or more integrated circuits, e.g., a cache controller, a prefetch engine, and a compression/decompression engine, which may be implemented using microcode and/or hard-coded logic. It will also be appreciated that the implementation of the functionality described herein in hardware is well within the abilities of one of ordinary skill in the art having the benefit of the instant disclosure.

Routine 50 begins in block 52 by issuing a request to retrieve the requested cache line from a lower level memory, e.g., main storage. Next, once the requested cache line is retrieved, block 54 determines whether the cache line is compressed, e.g., by detecting a field in the cache line indicating whether or not the cache line is compressed. If not, block 54 passes control to block 56 to store the cache line in the cache. Control then passes to block 58 to return the requested data to the processor, whereby routine 50 is complete.

If, on the other hand, the cache line is compressed, block 54 passes control to block 60 to both decompress the cache line and extract the prefetch history data embedded therein. Block 60 then passes control to blocks 56 and 58 to store the decompressed cache line in the cache and forward the requested data to the processor.

Moreover, block 60 also passes control to block 62 to forward the extracted prefetch history data to the prefetch engine. Then, in block 64, the prefetch engine issues one or more prefetch requests to the lower level memory based upon the prefetch history data extracted from the cache line. As such, process of retrieving the additional data that is likely to be requested by the processor in the near future is initiated prior to a cache miss on that requested data. As can be seen from FIG. 6, it may be desirable to perform blocks 62 and 64 concurrently with performing blocks 56 and 58, although no particular temporal ordering of these operations is necessarily required.

As has been discussed above, it may be desirable in some embodiments to utilize confidence data to trigger when embedded prefetch history data is or is not used to automatically prefetch additional data in response to a cache line miss. To illustrate this additional functionality, routine 50 also illustrates an optional block 66, which may be used to condition the issue of prefetch requests to lower level memory in response to a cache miss. In particular, in the alternate embodiment, block 62, upon forwarding the prefetch history data to the prefetch engine, passes control to block 66 instead of block 64. Block 66 then determines whether a confidence threshold is met with respect to the prefetch history data, and passes control to block 64 to issue one or more prefetch requests only when the confidence threshold has been met. If the confidence threshold is not met, block 66 bypasses block 64, thereby inhibiting the issue of a prefetch request.

It should be appreciated that confidence data may be associated with all of the prefetch history data embedded in a cache line, or alternatively, confidence data may be associated with individual segments of data (e.g., cache lines) that may be identified in the prefetch history data. For example, in one embodiment, the prefetch history data may include one or more prefetch pointers that point to additional cache lines that may be prefetched as a result of a cache miss to a requested cache line. Confidence data may be associated with each prefetch pointer indicating the degree of confidence that the cache line pointed to by that prefetch pointer will be needed in the near future.

In the event that confidence data is embedded in the prefetch history data for a cache line, it may also be desirable to update the confidence data in the prefetch history table based upon tracked accesses to cache lines currently present in the cache. As such, an optional block 68 may utilize the occurrence of a cache miss to the requested cache line in block 52 to update confidence data for any prefetch history table entry that references that requested cache line. As an example, block 68 may determine that the requested cache line in block 52 is pointed to by one of a plurality of prefetch pointers in an entry in the prefetch history table for another cache line, indicating that the current cache line generated a miss subsequent to the retrieval of the cache line represented in the prefetch history table entry. It should also be noted that all memory access requests, rather than just access requests that miss a cache, may also be tracked in some embodiments. As such, block 68 may also be executed for additional memory requests that do not result in the processing of the cache miss as illustrated in FIG. 6.

Figure 7:
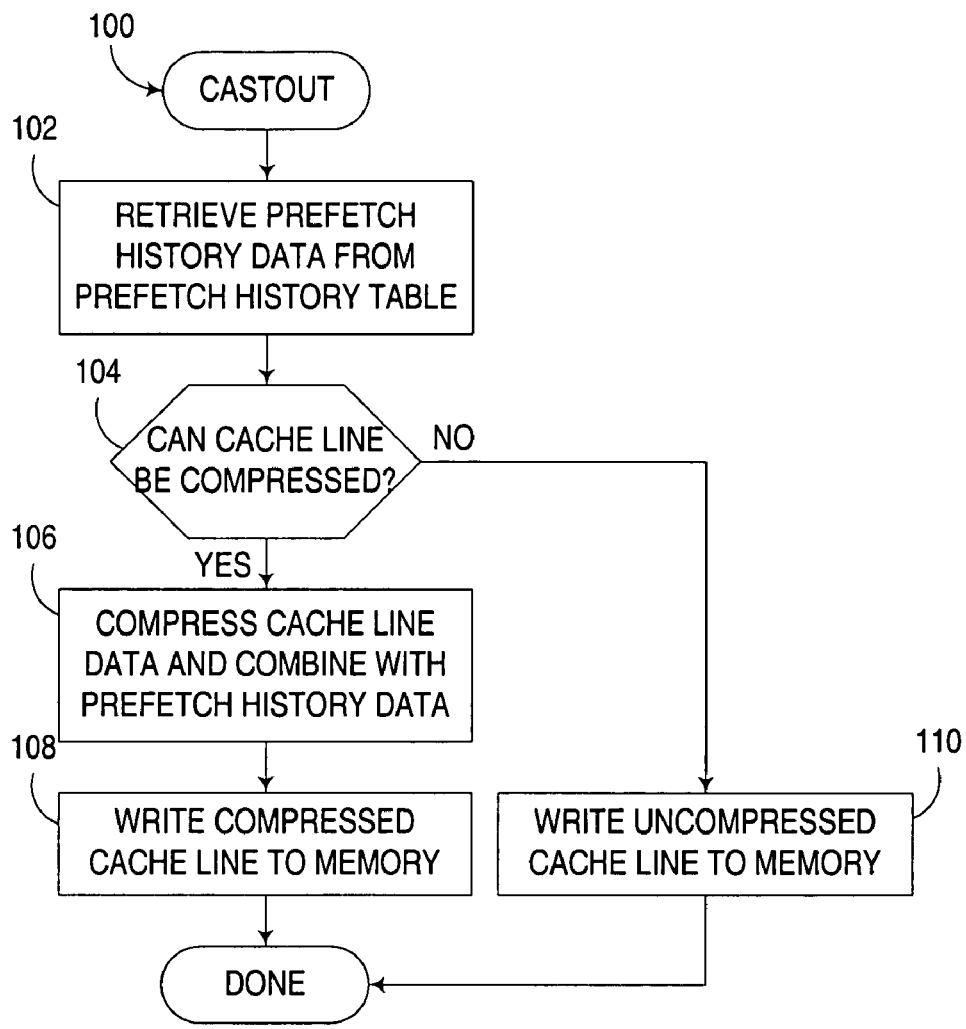
FIG. 7 is a flowchart illustrating the steps performed in connection with a cache line castout operation in the apparatus of FIG. 1.

FIG. 7 next illustrates a castout routine 100, which is executed as a result of a castout of a cache line, e.g., as the result of the need to free up a cache line in the cache for another incoming cache line. As noted above, the castout may require writing of a cache line out to memory if the line is modified, and may even require an unmodified line to be written to memory if the prefetch history data for that cache line has changed. Routine 100 begins in block 102 by retrieving the prefetch history data for the cache line from the prefetch history table. Alternatively, block 102 may be performed any other time prior to compression of the cache line and combination with the prefetch data. Next, block 104 determines whether the cache line can be compressed. For example, block 104 may determine whether the type of data in the cache line is suitable for compression, or alternatively, whether compression of the cache line will result in sufficient space for storing prefetch history data.

If the cache line is determined to be compressible, block 104 passes control to block 106 to compress the cache line data and combine the compressed data with the prefetch history data for the cache line. As noted above, the prefetch history data may be combined with the cache line data prior to or after compression of the cache line data. Next, block 108 writes the compressed cache line, including the embedded prefetch history data to memory, whereby routine 100 is complete.

Returning to block 104, if the cache line cannot be compressed, block 104 passes control to block 110 to write the uncompressed cache line to memory, whereby routine 100 is complete. In that event, no prefetch history data is embedded in the cache line.

Figure 8A:
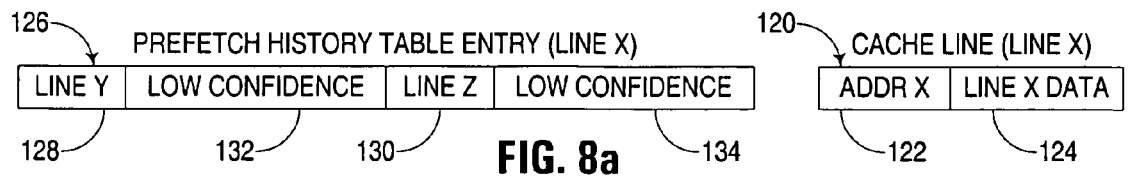
FIGS. 8a–8d are block diagrams illustrating the state of a prefetch history table entry and associated cache line in response to an exemplary sequence of accesses in a program executed by the apparatus of FIG. 1.

FIGS. 8a–8d next illustrate an exemplary sequence of accesses to a particular cache line (identified as line X) in a program being executed by computer 10. FIG. 8a, in particular, illustrates an exemplary cache line 120 including a tag field 122 identifying the address of cache line X, along with the actual cache data in field 124.

FIG. 8a also shows a corresponding prefetch history table entry 126 for line X, including a pair of prefetch pointers 128, 130, along with associated confidence data fields 132, 134 representing the confidence level for each prefetch pointer 128, 130. Assume that cache line X is brought into the cache as a result of a cache miss, and the associated prefetch history data therefor is extracted and placed in the prefetch history table. Also assume that, at least initially, the prefetch history algorithm has identified two cache lines, lines Y and Z, which have been previously seen, but only with low confidence. In many embodiments, it may be desirable to inhibit prefetching of cache lines having only a low confidence.

Figure 8B:
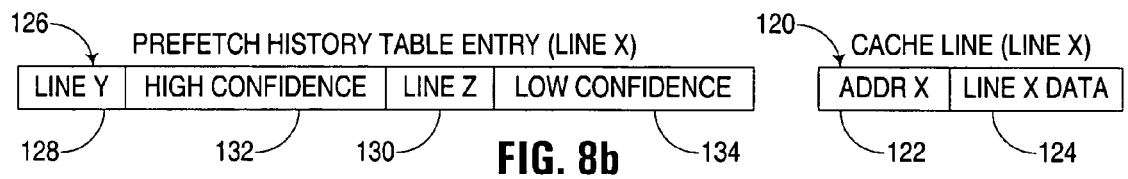

FIG. 8b next illustrates the state of prefetch history table entry 126 after a cache miss to line Y is seen. In this event, the prefetch pointer 128 to line Y may be determined to be a "high confidence" pointer, indicating that this line should be prefetched following cache misses to line X in the future. As such, field 132 may be updated to reflect the high confidence associated with line Y.

Figure 8C:
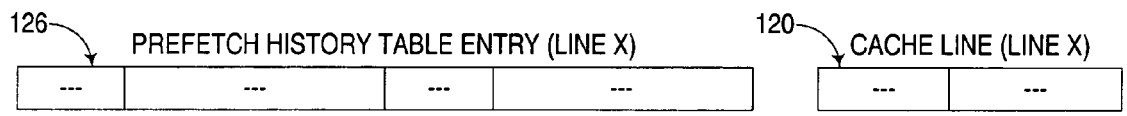
Figure 8D:
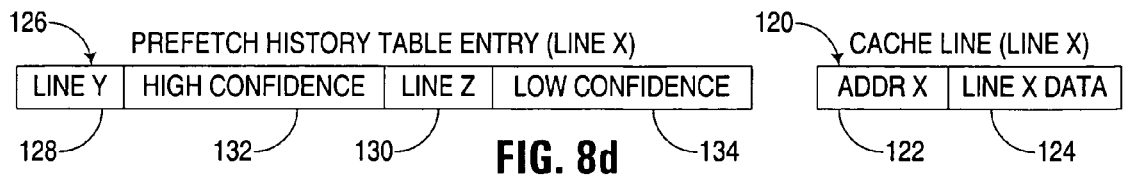

FIG. 8c next illustrates the replacement of cache line X in the cache, whereby the prefetch history table entry, and possibly the modified cache line data, are castout to memory. FIG. 8d then illustrates the occurrence of a second cache miss to line X, which results in the retrieval of line X into cache line 120, as well as the extraction of the prefetch history data from the representation of the cache line in memory. In addition, given that line Y is now known to be a pointer with a "high" level of confidence, the cache miss to line X may result in an automatic prefetch of line Y, possibly avoiding a second cache miss on line Y.

Various modifications may be made to the illustrated embodiments without departing from the spirit and scope of the invention. For example, other known history-based prefetching algorithms may also be enhanced using the herein-described techniques. By virtue of the compression of cache lines, and the embedding of prefetch history data within such cache lines, existing prefetching algorithms may often be implemented with reduced dedicated storage requirements for the prefetch history data generated and maintained thereby.

Also, it will be appreciated that various optimizations may be used to further reduce the size of a prefetch history table. For example, prefetch history data may be combined with cache lines and written to memory before the cache line is cast out of the data array. In such an implementation, the cache line would become clean, and the prefetch history data would no longer need to be stored in the history table, enabling a smaller prefetch history table to be used. If the cache line was then later modified and cast out, either the prefetch history data could be overwritten, or it could be reread from memory, merged with the modified cache line, and rewritten to memory. Such an implementation may be acceptable in many environments, given that the latency of castout operations is usually not a great concern.

Additional modifications may be made consistent with the invention. Therefore the invention lies in the claims hereinafter appended.

What is claimed is:

1. A method of operating a cache, the method comprising:
   retrieving a first cache line from a memory;
   decompressing the first cache line;
   extracting from the first cache line prefetch history data;
   identifying a second cache line using the extracted prefetch history data, wherein the second cache line includes non-instruction data; and
   determining from confidence data in the extracted prefetch history data whether to prefetch the second cache line in association with retrieving the first cache line from the memory;
   wherein the prefetch history data includes a plurality of pointers to a plurality of cache lines, wherein the prefetch history data includes confidence data associated with each of the plurality of pointers the method further comprising accessing the confidence data associated with each of the plurality of pointers to determine whether to use the prefetch history data to prefetch any of the plurality of cache lines.

2. The method of claim 1, further comprising prefetching the second cache line based upon the confidence data.

3. The method of claim 2, wherein the prefetch history data includes a pointer to the second cache line.

4. The method of claim 2, wherein retrieving the first cache line is performed in response to a request directed to the first cache line, and wherein identifying and prefetching the second cache line are automatically performed in response to the request directed to the first cache line.

5. The method of claim 1, wherein the prefetch history data is stored in a compressed portion of the first cache line.

6. The method of claim 1, wherein the prefetch history data is stored in an uncompressed portion of the first cache line.

7. The method of claim 1, further comprising determining whether the retrieved first cache line is compressed, wherein decompressing the first cache line is performed only if the retrieved first cache line is determined to be compressed.

8. The method of claim 7, wherein determining whether the retrieved first cache line is compressed includes accessing a field in the retrieved first cache line.

9. The method of claim 8, wherein the accessed field is an error-correcting code (ECC) field.

10. The method of claim 1, further comprising:
    tracking access patterns after retrieving the first cache line; and
    updating the prefetch history data for the first cache line in response to tracking access patterns.

11. The method of claim 10, wherein tracking access patterns includes storing the prefetch history data in a learning queue and monitoring subsequent cache requests.

12. The method of claim 1, further comprising storing the prefetch history data in a prefetch history table.

13. The method of claim 12, wherein the prefetch history table includes an entry associated with each cache line in the cache.

14. The method of claim 1, further comprising casting out the first cache line into memory, including, prior to casting the first cache line out to memory:
    compressing the first cache line; and
    inserting the prefetch history data in the first cache line.

15. The method of claim 1, wherein the first cache line is compressed using significant-bit compression.

16. The method of claim 1, further comprising writing the prefetch history data to memory prior to casting out the first cache line.

17. The method of claim 1, wherein the cache is a data cache that is dedicated to storing only non-instruction data.

18. The method of claim 1, wherein the prefetch history data includes a bitmap mask that identifies which among a plurality of cache lines should be prefetched.

19. A method of writing a cache line stored in a cache to a memory, the method comprising:
    embedding in the cache line prefetch history data associated with the cache line, wherein the prefetch history data embedded in the cache line identifies at least one other cache line and includes confidence data for use in determining whether to prefetch the at least one other cache line in association with retrieving the cache line from the memory, and wherein the at least one other cache line includes non-instruction data;
    compressing the cache line; and
    storing the compressed cache line in a memory;
    wherein the prefetch history data includes a plurality of pointers to a plurality of cache lines, wherein the prefetch history data includes confidence data associated with each of the plurality of pointers and wherein the confidence data associated with each of the plurality of pointers is configured to be accessed in connection with retrieving the cache line to determine whether to use the prefetch history data to prefetch any of the plurality of cache lines.

20. The method of claim 19, wherein embedding the prefetch history data in the cache line is performed prior to compressing the cache line.

21. The method of claim 19, wherein embedding the prefetch history data in the cache line is performed after compressing the cache line.

22. A circuit arrangement configured to retrieve a first cache line from a memory, decompress the first cache line, extract embedded prefetch history data from the first cache line, identify a second cache line using the extracted prefetch history data, and determine from confidence data in the extracted prefetch history data whether to prefetch the second cache line in association with retrieving the first cache line from the memory, wherein the second cache line includes non-instruction data, wherein the prefetch history data includes a plurality of pointers to a plurality of cache lines, wherein the prefetch history data includes confidence data associated with each of the plurality of pointers, and wherein the circuit arrangement is further configured to access the confidence data associated with each of the plurality of pointers to determine whether to use the prefetch history data to prefetch any of the plurality of cache lines.

23. The circuit arrangement of claim 22, wherein the circuit arrangement is further configured to store the decompressed first cache line in a cache.

24. The circuit arrangement of claim 22, wherein the circuit arrangement is further configured to prefetch the second cache line based upon the confidence data.

25. The circuit arrangement of claim 24, wherein the prefetch history data includes a pointer to the second cache line.

26. The circuit arrangement of claim 24, wherein the circuit arrangement is configured to retrieve the first cache line in response to a request directed to the first cache line, and wherein the circuit arrangement is configured to identify and prefetch the second cache line automatically in response to the request directed to the first cache line.

27. The circuit arrangement of claim 22, wherein the circuit arrangement is further configured to determine whether the retrieved first cache line is compressed, and wherein the circuit arrangement is configured to decompress the first cache line only if the retrieved first cache line is determined to be compressed.

28. The circuit arrangement of claim 22, wherein the circuit arrangement is further configured to track access patterns after retrieving the first cache line and update the prefetch history data for the first cache line in response to tracking access patterns.

29. The circuit arrangement of claim 22, wherein the circuit arrangement is further configured to cast out the first cache line into memory by compressing the first cache line and inserting the prefetch history data in the first cache line prior to casting the first cache line out to memory.

30. An integrated circuit device comprising the circuit arrangement of claim 22.

31. An apparatus comprising the circuit arrangement of claim 22.

32. A program product, comprising a hardware definition program that defines the circuit arrangement of claim 22; and a computer readable recordable medium bearing the hardware definition program.

* * * * *